United States Patent
Kar et al.

(10) Patent No.: US 11,216,614 B2
(45) Date of Patent: Jan. 4, 2022

(54) METHOD AND DEVICE FOR DETERMINING A RELATION BETWEEN TWO OR MORE ENTITIES

(71) Applicant: Wipro Limited, Bangalore (IN)

(72) Inventors: Sibsambhu Kar, Bangalore (IN); Sriram Chaudhury, Bangalore (IN); Vinutha Bangalore Narayanamurthy, Bangalore (IN)

(73) Assignee: Wipro Limited, Bangalore (IN)

( * ) Notice: Subject to any disclaimer, the term of this patent is extended or adjusted under 35 U.S.C. 154(b) by 140 days.

(21) Appl. No.: 16/568,305

(22) Filed: Sep. 12, 2019

(65) Prior Publication Data
US 2021/0026920 A1  Jan. 28, 2021

(30) Foreign Application Priority Data
Jul. 25, 2019  (IN) .............................. 201941030113

(51) Int. Cl.
*G06F 40/205* (2020.01)
*G06N 20/10* (2019.01)
(Continued)

(52) U.S. Cl.
CPC .......... *G06F 40/205* (2020.01); *G06F 40/166* (2020.01); *G06F 40/284* (2020.01);
(Continued)

(58) Field of Classification Search
CPC .... G06F 40/205; G06F 40/166; G06F 40/284; G06F 17/30864; G06F 17/30277;
(Continued)

(56) References Cited

U.S. PATENT DOCUMENTS

| 7,730,085 | B2 | 6/2010 | Hassan et al. |
| 2010/0082331 | A1 | 4/2010 | Brun et al. |

(Continued)

FOREIGN PATENT DOCUMENTS

CN   101799802 A   8/2010

OTHER PUBLICATIONS

Sorokin, D, "Context-Aware Representations for Knowledge Base Relation Extraction", Sep. 7-11, 2017, Proceedings Conference on Empirical Methods in Natural Language Processing, Association for Computational Linguistics, pp. 1784-1789.

(Continued)

*Primary Examiner* — Quoc A Tran
(74) *Attorney, Agent, or Firm* — Finnegan, Henderson, Farabow, Garrett & Dunner, LLP (57) ABSTRACT

A method and a system of determining a relation between two or more entities in a text document is disclosed. In an embodiment, the method may include receiving training text data annotated with two or more entities, and creating one or more n-grams based on the training text data. The method may further include generating a Convolutional Neural Network (CNN) model using the one or more n-grams, and creating an entity vector using at least one of a word embedding and a numeric embedding based on the training text data. The method may further include generating a relation-entity model using the CNN model and the entity vector.

15 Claims, 9 Drawing Sheets

(51) Int. Cl.
  *G06N 3/08* (2006.01)
  *G06F 40/166* (2020.01)
  *G06F 40/284* (2020.01)
  *G06K 9/66* (2006.01)
  *G06K 9/62* (2006.01)
  *G06N 5/04* (2006.01)
  *G06F 17/00* (2019.01)

(52) U.S. Cl.
  CPC ............... *G06N 3/08* (2013.01); *G06N 20/10* (2019.01); *G06K 9/6262* (2013.01); *G06K 9/6276* (2013.01); *G06K 9/66* (2013.01); *G06N 5/046* (2013.01)

(58) Field of Classification Search
  CPC .......... G06N 20/10; G06N 3/08; G06N 5/046; G06K 9/66; G06K 9/6276; G06K 9/6262
  See application file for complete search history.

(56) References Cited

U.S. PATENT DOCUMENTS

| | | | |
|---|---|---|---|
| 2019/0007434 A1* | 1/2019 | McLane | G06N 3/084 |
| 2019/0214122 A1* | 7/2019 | Lee | G06F 16/3344 |
| 2020/0019632 A1* | 1/2020 | Larchev | G06F 16/242 |
| 2020/0380311 A1* | 12/2020 | Lourentzou | G06N 3/08 |
| 2021/0004672 A1* | 1/2021 | Glass | G06F 16/285 |

OTHER PUBLICATIONS

Zhou, P., et al., "Attention-Based Bidirectional Long Short-Term Memory Networks for Relation Classification", Aug. 7-12, 2016, Proceedings of the 54th Annual Meeting of the Association for Computational Linguistics, Association for Computational Linguistics, pp. 207-212.

* cited by examiner

METHOD AND DEVICE FOR DETERMINING A RELATION BETWEEN TWO OR MORE ENTITIES

TECHNICAL FIELD

This disclosure relates generally to determining a relation, and more particularly to a method and a system of determining a relation between two or more entities in a text document.

BACKGROUND

Textual data may be available in form of structured information or unstructured information. The structured information may refer to information of which the intended meaning is represented in structure or format of the data. The unstructured information may refer to information of which the intended meaning requires interpretation, in order to approximate and extract the intended meaning. For example, unstructured information may include natural language documents, speech data, audio data, image data, and video data. The natural language documents may be processed using various Natural Language Processing (NLP) techniques.

However, extraction of information from the unstructured data using NLP may face various difficulties. For example, one of the difficulties pertains to extraction of entities from a text document and extraction of relations among these entities. As it may be understood, an entity may refer to an object, item, person, place, value, concept, etc. For example, in a sentence "Sam is an employee in Wipro", the words "Sam" and "Wipro" may act as entities. A relation may refer to information that connects two or more entities. In the above example, "Sam" and "Wipro" may be connected by an "employer-employee" relation. Some practical examples of extracting relations between entities, in response to receiving an entity (word) selection from a user, may include generating a structured table of "parameter-value" from a medical document/report, generating a structured table of "owner-business" from a business report, and generating a structured table of "person-citizenship" or other information from any official or public document. Some examples of automatically extracting entities having a set of relations may include identifying structured medical data of a person from the medical document/report (for example, "patient-parameter(1)", parameter(2), etc.), and generating the structured information of a product from a report (for example, product(1)-ingredient(1), ingredient(2), etc.).

Some known techniques for extracting the relations between related entities may use a supervised approach. In such techniques, a human expert shall manually identify the entities and the relations between the entities, in an example text. A classifier may be trained on this example text, and may be used later to detect the relations and the entities during run-time. However, in such techniques, a large volume of annotated data has to be generated manually. Further, some semi-supervised approaches are known in which seed samples may be provided by an expert. Corresponding to that, more examples similar to the seed samples may be automatically obtained. These seed samples and the obtained examples may then be used to train a classifier. In these techniques, word embedding for a set of dictionary words may be used to extract the relations between the entities. However, these techniques may fail to consider numeric entities as input during extracting the relations between the entities, as a result of which accuracy of the extracted relations may not be accurate. For example, in case of numeric inputs, the known techniques may not consider the input and may simply replace the input by a common identifier "UNK".

SUMMARY

In one embodiment, a method of determining a relation between two or more entities in a text document is disclosed. In an embodiment, the method may include receiving training text data annotated with two or more entities, and creating one or more n-grams based on the training text data. The method may further include generating a Convolutional Neural Network (CNN) model using the one or more n-grams, and creating an entity vector using at least one of a word embedding and a numeric embedding based on the training text data. The method may further include generating a relation-entity model using the CNN model and the entity vector.

In another embodiment, a system for determining a relation between two or more entities in a text document is disclosed. The system includes a relation determining device which includes a processor and a memory communicatively coupled to the processor. The memory stores processor instructions, which, on execution, may cause the processor to receive training text data annotated with two or more entities, and create one or more n-grams based on the training text data. The processor instructions, on execution, may further cause the processor to generate a CNN model using the one or more n-grams, and create an entity vector using at least one of a word embedding and a numeric embedding based on the training text data. The processor instructions, on execution, may further cause the processor to generate a relation-entity model using the CNN model and the entity vector.

In yet another embodiment, a non-transitory computer-readable storage medium is disclosed. The non-transitory computer-readable storage medium has stored thereon, a set of computer-executable instructions causing a computer comprising one or more processors to perform steps that may include receiving training text data annotated with two or more entities, and creating one or more n-grams based on the training text data. The steps may further include generating a CNN model using the one or more n-grams, creating an entity vector using at least one of a word embedding and a numeric embedding based on the training text data. The steps may further include generating a relation-entity model using the CNN model and the entity vector.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
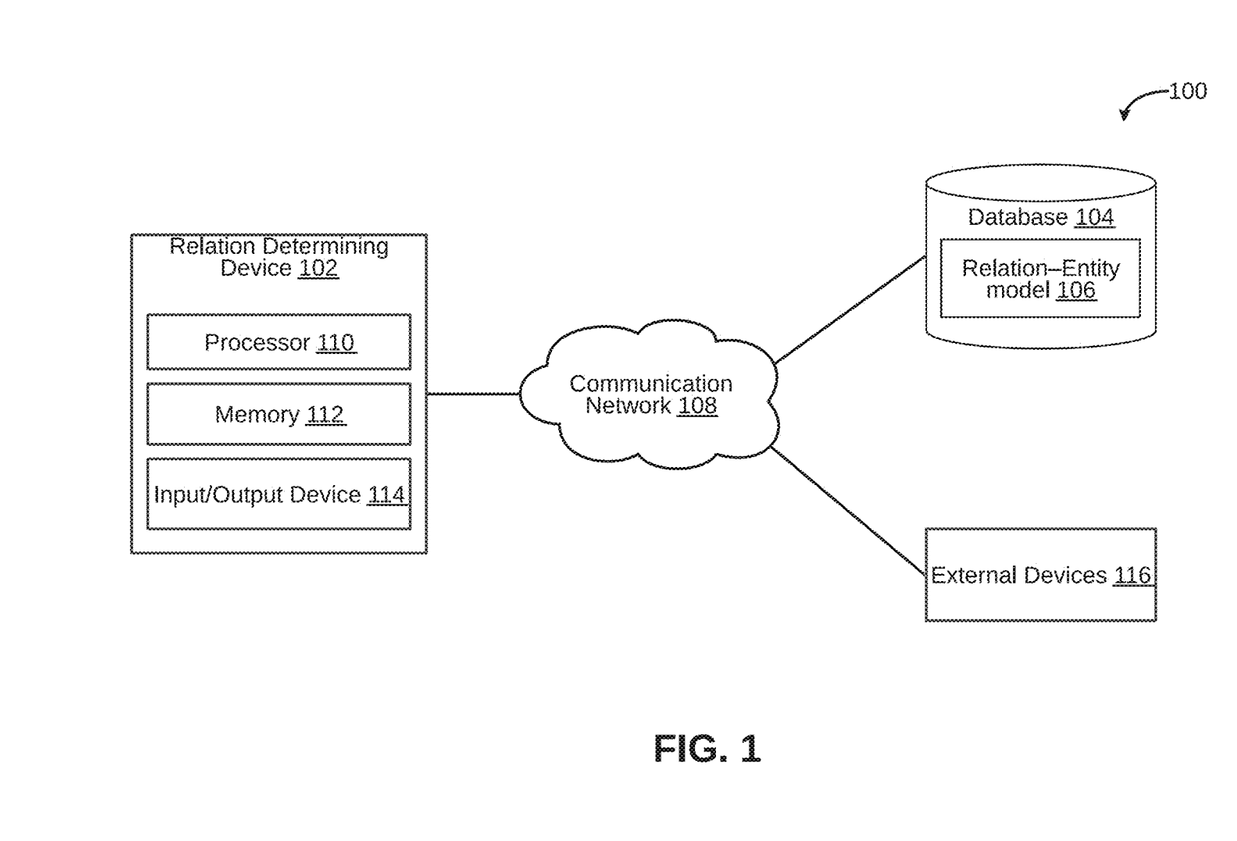
FIG. 1 illustrates a system for determining a relation between two or more entities in a text document, in accordance with an embodiment.

In one embodiment, a system 100 for determining a relation between two or more entities in a text document is illustrated in the FIG. 1, in accordance with an embodiment. The system 100 may include a relation determining device 102, and a database 104. The database 104 may store a relation-entity model 106. The relation determining device 102 may be a computing device having an ability of determining a relation between two or more entities in a text document. For example, the relation determining device 102 may extract relations between multiple entities and automatically generate a structured table including a relation-entity pair from a set of unstructured text data. Examples of the relation determining device 102 may include, but are not limited to a server, a desktop, a laptop, a notebook, a netbook, a tablet, a smartphone, a mobile phone, an application server, a sever, or the like. The relation determining device 102 may be communicatively coupled to the database 104 via a communication network 108. The communication network 108 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), General Packet Radio Service (GPRS), and Global System for Mobile Communications (GSM).

As will be described in greater detail in conjunction with FIG. 2 to FIG. 8, in order to determine a relation between two or more entities in a text document, the relation determining device 102 may receive training text data annotated with two or more entities, and create one or more n-grams based on the training text data. The relation determining device 102 may further generate a CNN model using the one or more n-grams, and create an entity vector using at least one of a word embedding and a numeric embedding based on the training text data. The relation determining device 102 may further generate a relation-entity model using the CNN model and the entity vector.

In order to perform the above discussed functionalities, the relation determining device 102 may include a processor 110 and a memory 112. The memory 112 may store instructions that, when executed by the processor 110, cause the processor 110 to determine a relation between two or more entities in a text document, as discussed in greater detail in FIG. 2 to FIG. 8. The memory 112 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited to Dynamic Random Access Memory (DRAM), and Static Random-Access memory (SRAM). The memory 112 may also store various data (e.g., training text data, annotation data, n-grams data, a Convolutional Neural Network (CNN) model, entity vector data, relation-entity model, a transfer learning model, a base model, parameters data, learned weights data, user selection data, graphical representation data, feedback data, etc.) that may be captured, processed, and/or required by the system 100.

The relation determining device 102 may further include one or more input/output device 114 through which the relation determining device 102 may interact with a user and vice versa. By way of an example, the input/output device 114 may be used to receive a user input from a user for selection of an entity. The system 100 may interact with one or more external devices 116 over the communication network 108 for sending or receiving various data. Examples of the one or more external devices may include, but are not limited to a remote server, a digital device, or another computing system.

Figure 2:
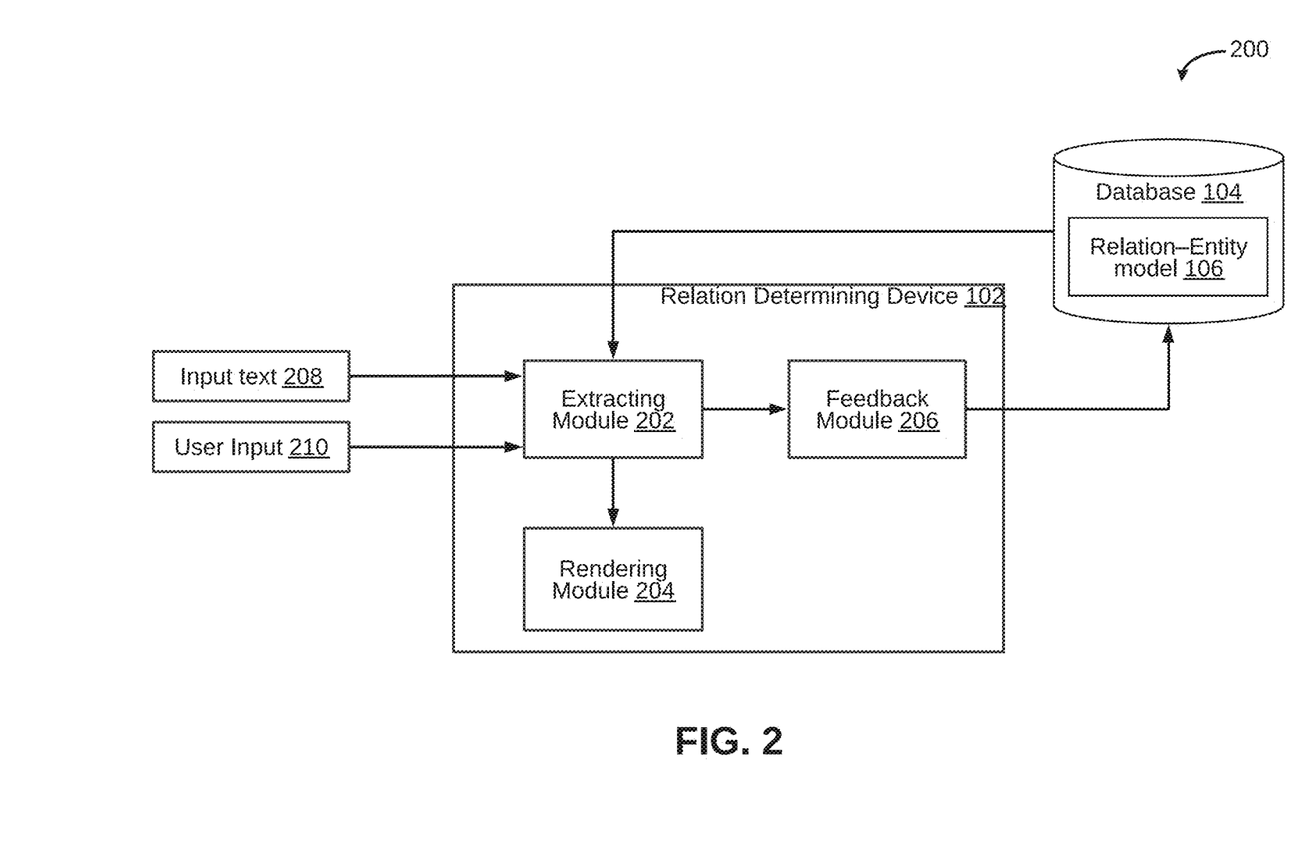
FIG. 2 is a functional block diagram of a system for determining a relation between two or more entities in a text document, in accordance with an embodiment.

Referring now to FIG. 2, a functional block diagram of a system 200 (analogous to the system 100) for determining a relation between two or more entities in a text document is illustrated, in accordance with an embodiment. The system 200 may include the relation determining device 102 and the database 104. The relation determining device 102 may include an extracting module 202, a rendering module 204, and a feedback module 206. The database may store the relation-entity model 106. The generation of relation-entity model 106 is further explained later in detail in conjunction with FIG. 3 and FIG. 4.

The extracting module 202 may receive an input text 208 and a user input 210. The input text 208 may include one or more text sentences along with one or more known entities. By way of an example, the input text may include the following text sentences:

"Iniesta (entity-1) is a Spanish (entity-2) footballer. Iniesta (entity-3) plays for club Barcelona (entity-4). Barcelona (entity-5) belongs to Catalonia (entity-6) community in Spain."

In the above example, as indicated, the input text includes a multiple number of entities: "Iniesta" being entity-1, "Spanish" being entity-2, "Iniesta" being entity-3, "Barcelona" being entity-4, "Barcelona" being entity-5, and "Catalonia" being entity-6.

In some embodiments, the user input 210 may include a user selected relation for which all related pairs of entities may be extracted. By way of an example, the user input 210 may include a user selecting an entity or a set of entities, for which all relations of the selected entity or the set of entities with other entities may be extracted. In the above example, the user input may include a user selecting the entity-1 (i.e.

"Iniesta"). As such, all possible relations corresponding to the entity-1 with other entities may be extracted. By way of another example, the user input may include selecting "country of citizenship" from a pre-specified list. As a result, an entity pair "Iniesta"-"Spain" may be generated. The extracting module 202 may extract the entities and relations between the entities based on the received input text 208 and the user input 210, using the relation-entity model 106. It may be noted that the relation-entity model 106 may be trained to detect and extract the relations between one or more entities in the input text 208.

The rendering module 204 may receive the extracted entities and the relations between the entities from the extracting module 202. In some embodiments, the extracted entities and the relations between the entities may be represented as a knowledge graph. The knowledge graph may show the entities which are connected through a selected relation. This knowledge graph may be rendered on a display device.

The feedback module 206 may receive the extracted entities and the relations between the entities from the extracting module 202. The feedback module 206 may further receive a feedback from a user on the relation determined between two or more entities. By way of an example, if the relation determined between the entities is correct, then the user may provide a feedback that the determined relation is correct. However, if the relation determined between the entities is correct, then the user may provide a feedback that the determined relation is incorrect and may further provide a correct relation between the entities, as part of the feedback. Upon receiving the feedback from the user, the feedback module 206 may dynamically update the relation-entity model 106 incrementally based on the user feedback. In other words, the relation-entity model may incrementally learn on the feedback received from the user from time to time.

Figure 3:
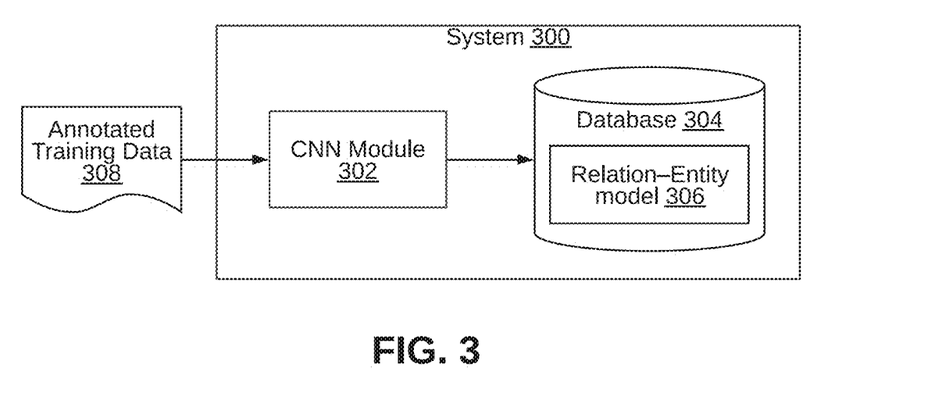
FIG. 3 illustrates a system for generating a relation-entity model using a Convolutional Neural Network (CNN) model, in accordance with another embodiment.

Referring now to FIG. 3, a system 300 for generating a relation-entity model using a Convolutional Neural Network (CNN) model is illustrated, in accordance with an embodiment. The system 300 may include a CNN module 302 and a database 304. Once a relation-entity model 306 is generated, the relation-entity model 306 may be stored in the database 304. The CNN module 302 may receive an annotated training data 308. By way of an example, the annotated training data 308 may include a set of sentences in which each of one or more entities and one or more relations between each pair of the entities is marked. The annotated training data 308 may be used by the CNN module 302 to generate the relation-entity model 306. In particular, the CNN module 302 may implement CNN model to generate the relation-entity model 306.

In some embodiments, the CNN module 302 may be configured to consider the task of extracting relations between the entities as a multi-class classification problem. It may be noted that unlike conventional techniques, the CNN module 302 may consider both words and a specific group of numbers as input, at an embedding layer. The CNN module 302 may generate the relation-entity model 306 using the received annotated training data 308. Upon generating, the CNN module 302 may send the generated relation-entity model 306 to the database 304 which may store the relation-entity model 306 for processing during run-time.

Figure 4:
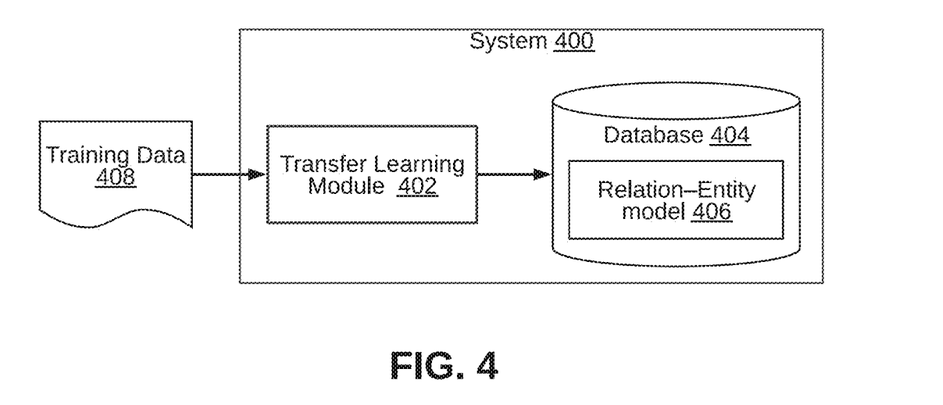
FIG. 4 illustrates a system for generating a relation-entity model using a transfer learning model, in accordance with an embodiment.

Referring now to FIG. 4, a system 400 for generating a relation-entity model using a transfer learning model is illustrated, in accordance with an embodiment. The system 400 may include a transfer learning module 402 and a database 404. The generated relation-entity model 406 may be stored in the database 404. The stored relation-entity model 406 may be used during run-time for extracting the relations between the entities. The transfer learning module 402 may receive training data 408. The training data 408 may include a set of sentences with at least two entities, and at least one relation between each pair of the entities. It may be noted that the entities may be text or numeric. Further, the entities and the relations between the entities may be annotated. For example, the entities may be marked and the relations between the entities may be marked into appropriate class of relations.

In some embodiments, the transfer learning module 402 may receive abase model (not shown in the FIG. 4). It may be noted that the transfer learning module 402 may employ a transfer learning model instead of a CNN model, when available data in not sufficient to generate a relation-entity model using the CNN model. It may be further noted that, in the conventional transfer learning techniques, one or more layers of the network may receive parameters (for example, learned weights of the network) from a base model trained on large corpus of similar data. These one or more layers may be either frozen or allowed to be trained with limited set of new data. In such cases, a set of filters in the convolutional layer may remain fixed (depending on their significance in classifying the relations) as the base model. The remaining layers may be allowed to learn with the new data. It may be understood that the remaining layers may learn new patterns in the new data. The fully connected layer parameters may be allowed to re-learn with new datasets.

Figure 5A:
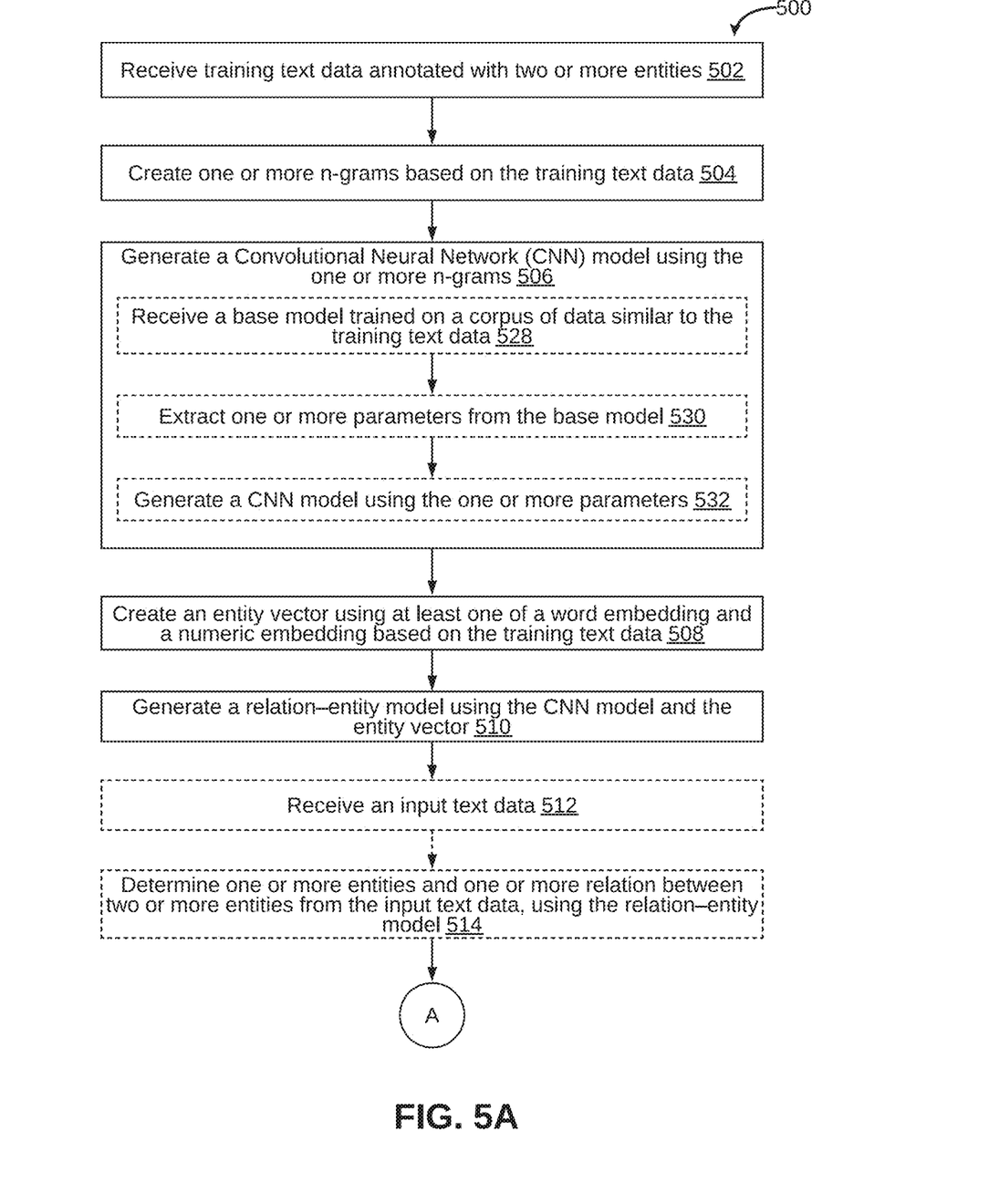
FIGS. 5A and 5B collectively depict a flowchart of a method of determining a relation between two or more entities in a text document, in accordance with an embodiment.
Figure 5B:
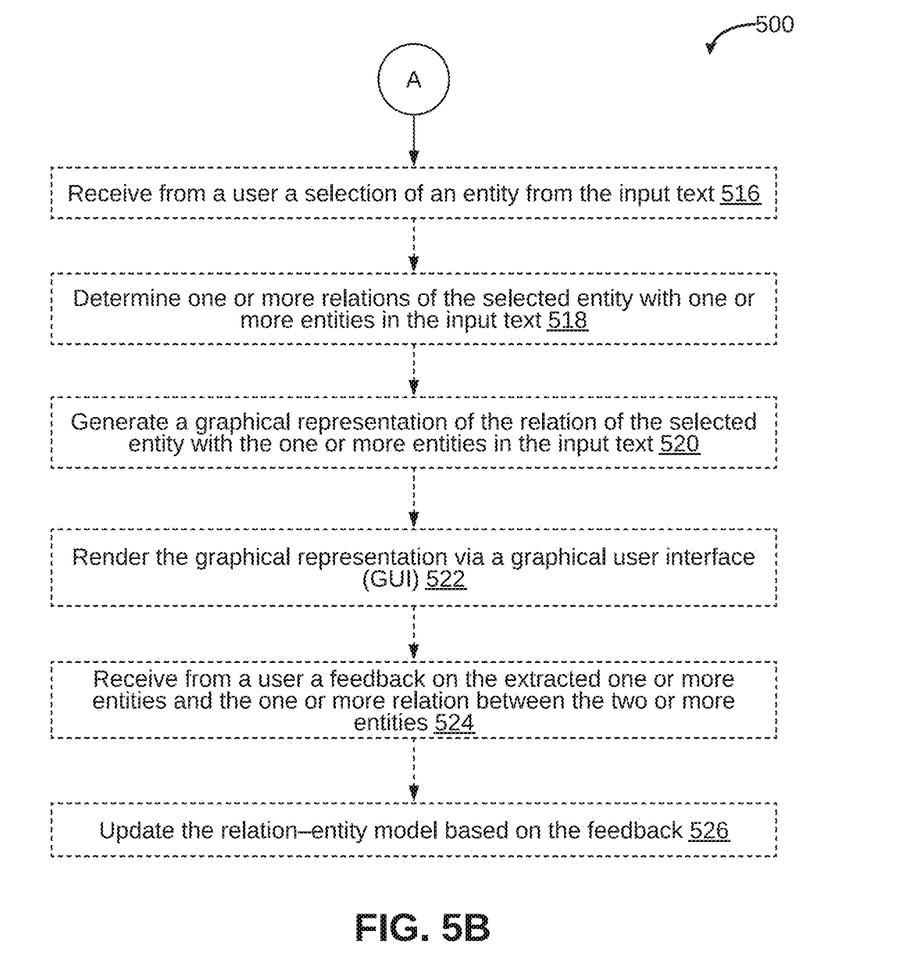

Referring now to FIGS. 5A and 5B, which collectively depict a flowchart 500 for a method of determining a relation between two or more entities in a text document is illustrated, in accordance with an embodiment. At step 502, training text data annotated with two or more entities may be received. At step 504, one or more n-grams based on the training text data may be created. At step 506, a CNN model may be generated using the one or more n-grams. At step 508, an entity vector may be created using at least one of a word embedding and a numeric embedding based on the training text data. At step 510, a relation-entity model may be generated using the CNN model and the entity vector.

Additionally, at step 512, an input text data may be received. At step 514, one or more entities and one or more relations between two or more entities may be determined from the input text data, using the relation-entity model. At step 516, a selection of an entity from the input text may be received from a user. At step 518, one or more relations of the selected entity with one or more entities in the input text may be determined. At step 520, a graphical representation of the relations of the selected entity with the one or more entities in the input text may be generated. At step 522, the graphical representation may be rendered via a graphical user interface (GUI). At step 524, a feedback may be received from a user on the extracted one or more entities and the one or more relations between the two or more entities. At step 526, the relation-entity model may be updated based on the feedback.

At step 502, the training text data annotated with two or more entities may be received. In some embodiments, the training text data may include one or more textual sentences. At step 504, one or more n-grams based on the training text data may be created. As it will be appreciated by those skilled in the art, an n-gram may be a contiguous sequence of n items belonging to a text sample. Accordingly, an n-gram may be of size 1, or size 2, or size 3, and so on. An n-gram of size 1 may be referred to as a "unigram", an n-gram of size 2 may be referred to as a "bigram", an n-gram of size 3 may be referred to as a "trigram", and so on.

At step 506, a CNN model may be generated using the one or more n-grams. In some embodiments, generating the CNN model may further include additional steps. By way of an example, at step 528, a base model trained on a corpus of data similar to the training text data may be received. At step 530, one or more parameters may be extracted from the base model. At step 532, the CNN model may be generated using the one or more parameters. It may be noted that at least one of a plurality of layers of the CNN model may be trainable using training text data. It may be noted that the one or more parameters may include one or more learned weights associated with the CNN model. At step 508, an entity vector may be created using at least one of a word embedding and a numeric embedding, based on the training text data. At step 510, a relation-entity model may be generated using the CNN model and the entity vector.

At step 512, the input text data may be received. At step 514, one or more entities and one or more relation between two or more entities may be determined from the input text data, using the relation-entity model. At step 516, a selection of an entity from the input text may be received from a user. At step 518, one or more relations of the selected entity with one or more entities in the input text may be determined. At step 520, a graphical representation of the relation of the selected entity with the one or more entities in the input text may be generated. At step 522, the graphical representation may be rendered via a graphical user interface (GUI). At step 524, a feedback may be received from a user on the extracted one or more entities and the one or more relations between the two or more entities. At step 526, the relation-entity model may be updated based on the feedback.

Figure 6:
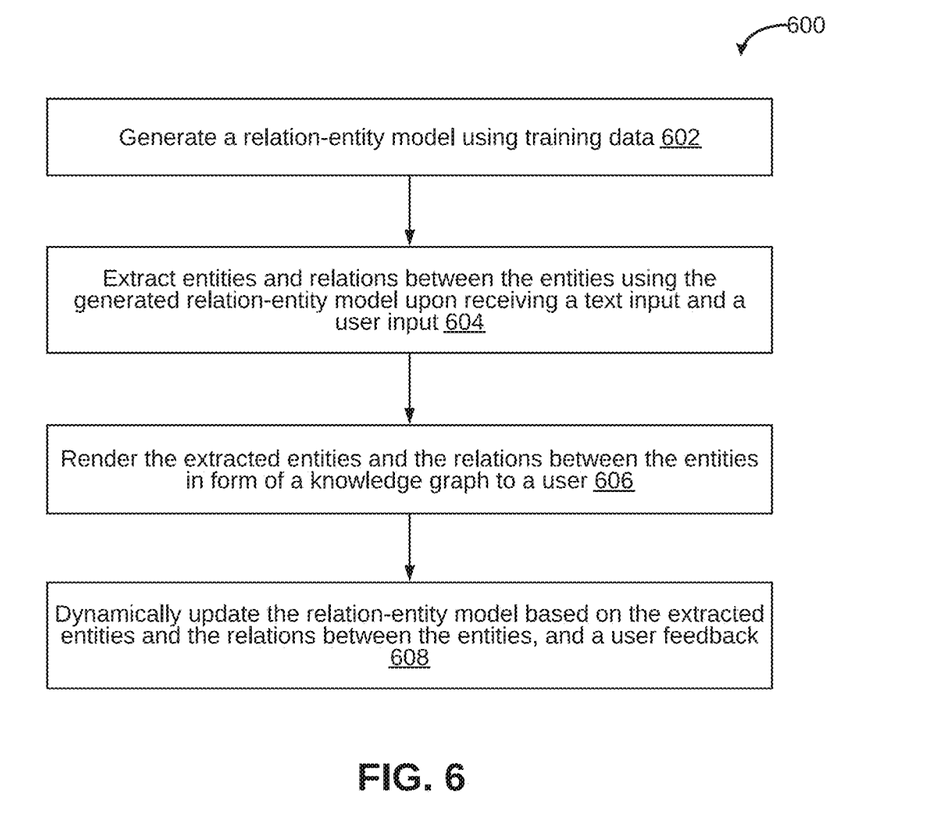
FIG. 6 is a flowchart of a method of determining a relation between two or more entities in a text document, in accordance with another embodiment.

Referring now to FIG. 6, a flowchart 600 of a method of determining a relation between two or more entities in a text document is illustrated, in accordance with another embodiment. At step 602, a relation-entity model may be generated using training data. At step 604, entities and relations between the entities may be extracted using the generated relation-entity model upon receiving a text input and a user input. At step 606, the extracted entities and the relations between the entities may be rendered in a form of a knowledge graph to a user. At step 608, the relation-entity model may be dynamically updated based on the extracted entities and the relations between the entities, and a user feedback.

At step 602, the relation-entity model may be generated using training data. It may be noted that in the training data, one or more entities and one or more relations between the one or more entities may be annotated. In some embodiments, the relation-entity model may be generated using a CNN model using annotated training data (as explained in the FIG. 3). In alternate embodiments, the relation-entity model may be generated using a transfer learning model using the training data (as explained in the FIG. 4). The CNN model is further explained in detail in conjunction with FIG. 7.

Figure 7:
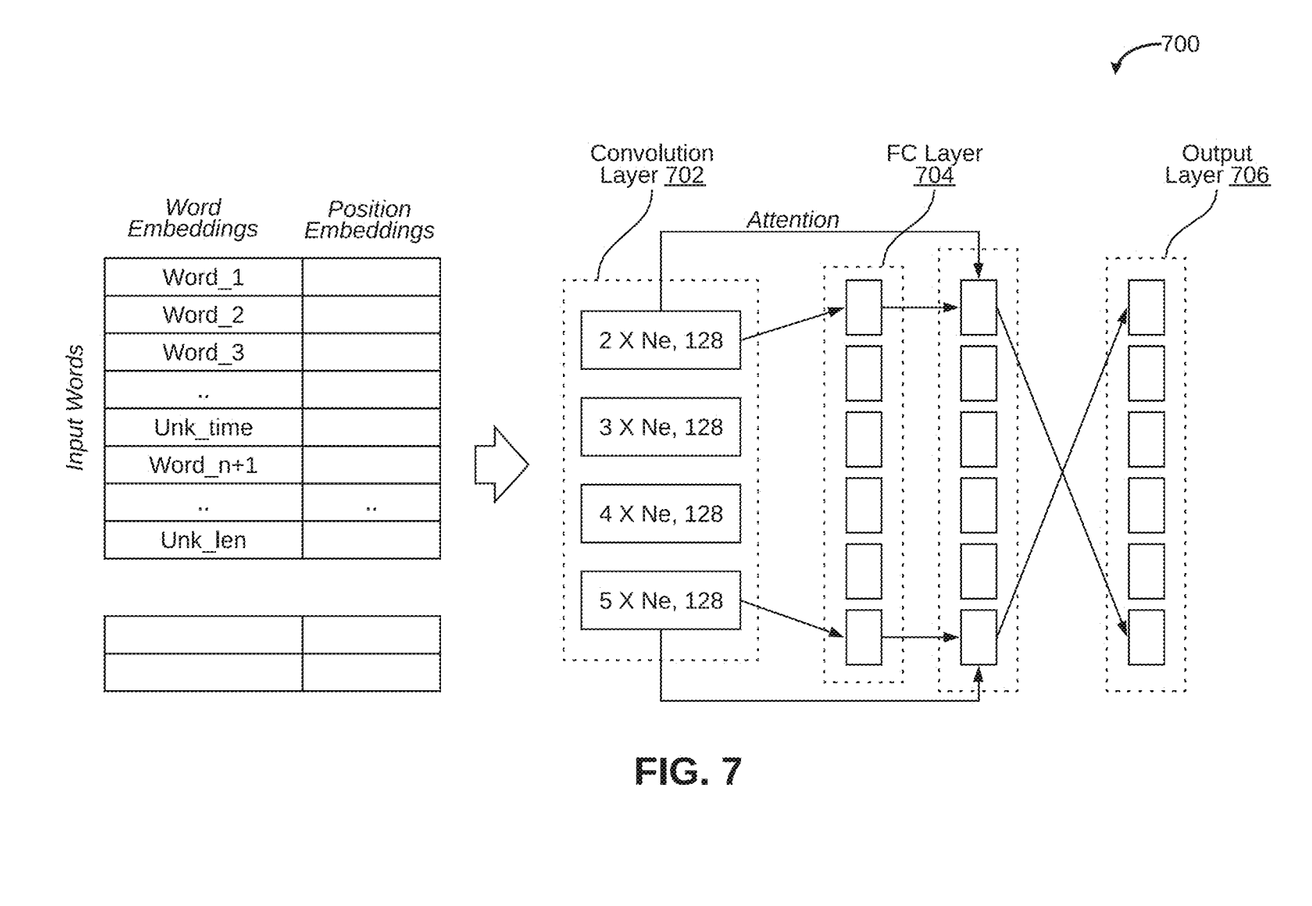
FIG. 7 illustrates a CNN model, in accordance with an embodiment

Referring now to FIG. 7, a CNN model 700 is illustrated, in accordance with an embodiment. The CNN model 700 may use a convolution layer 702 followed by a max pooling layer (not shown in FIG. 7), and one fully connected (FC) layer 704 followed by softmax output layer 706. As mentioned earlier, the CNN model 700 may be configured to consider the task of extracting relations between entities as a multi-class classification problem, and the CNN model 700 may be configured to use both words and a specific group of numbers as inputs at the embedding layer. It may be noted that conventional techniques for extracting relations between entities may use word embeddings for a set of dictionary words. However, for numeric inputs, the conventional techniques may not consider the numeric input, or may replace the numeric input by a common identifier "UNK".

In some embodiments, a regular expression may be used to identify a class of commonly used numeric quantities (for example, unk_time for time related numbers, unk_wt for weight related numeric entities, and the like). Further, the regular expression may be used as valid input at an embedding layer of the CNN model 700. The embedding for such numeric identifiers may be initialized with random numbers and allowed to learn during the model generation process. Accordingly, the use of numeric embedding may allow identifying relations involving mixed text and numeric entities. An example input sentence is given below:

"The creatinine level of the employee was found to be 0.94 mg/DL after the experiment"

In the above sentence, selected entities may include: "employee", and "0.94 mg/DL. A relation class may be "level of creatinine". As such, an input to the CNN model 700 may be as the following:

"The creatinine level of the employee was found to be unk_CL after the experiment."

It may be noted that each word may be passed to an input layer of the CNN model 700 in the form of a word embedding. The entity "unk_CL" may be initialized with random embedding. A position embedding may be determined for each word. For example, for the word "The" in the above input sentence, the position embeddings may be as the following:

Position_embedding1: <distance from entity1:"employee">: 4
Position_embedding2: <distance from entity2:"0.94 mg/DL">: 9

Similarly, for the word "creatinine" in the above input sentence, the position embeddings may be as the following:

Position_embedding1: <distance from entity1:"employee">: 3
Position_embedding2: <distance from entity2:"0.94 mg/DL">: 8

The position embeddings for the rest for the words of the input sentence may be determined in a similar fashion.

In some embodiments, for enhanced relation extraction, an attention mechanism may be used. The convolution layer 702 may extract features from a set of words, depending on dimensions of the convolution filter. For example, a filter of dimension may 3 extract feature from three consecutive words (also called 3-gram). These features may be passed to multiple fully connected (FC) layers 704 to create rich and complex features, and then to the softmax output layer 706 for classification. In some cases, during merging the features through FC layers 704, some important raw features (i.e. output from the convolution layer 702) may miss to influence the classification. In such cases, the attention technique may help in combining raw features and the rich features (output of FC layer 704) for better decision making.

Returning to FIG. 6, at step 604, the entities and the relations between the entities may be extracted using the generated relation-entity model upon receiving a text input and a user input. For example, the extracting module 202 may receive the input text 208 and the user input 210 from a user, and may extract the entities and the relations between the entities based on the received input text 208 and the user input 210. The relation-entity model may be used to detect and extract the relations between the entities in the text input 208 provided by the user. In some embodiments, the extracting module 202 may extract entities for a selected relation through a graphical user interface (GUI). The extracting of the relations from the entities is further explained by way of an example, in conjunction with FIGS. 8A and 8B.

Figure 8A:
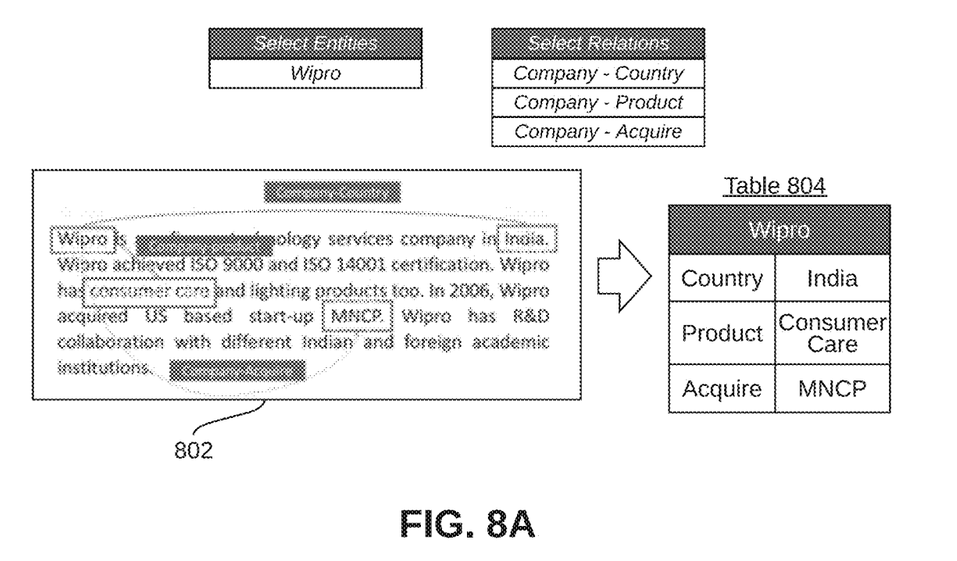
FIGS. 8A and 8B illustrate a process of extracting relations from entities, in accordance with some embodiments.
Figure 8B:
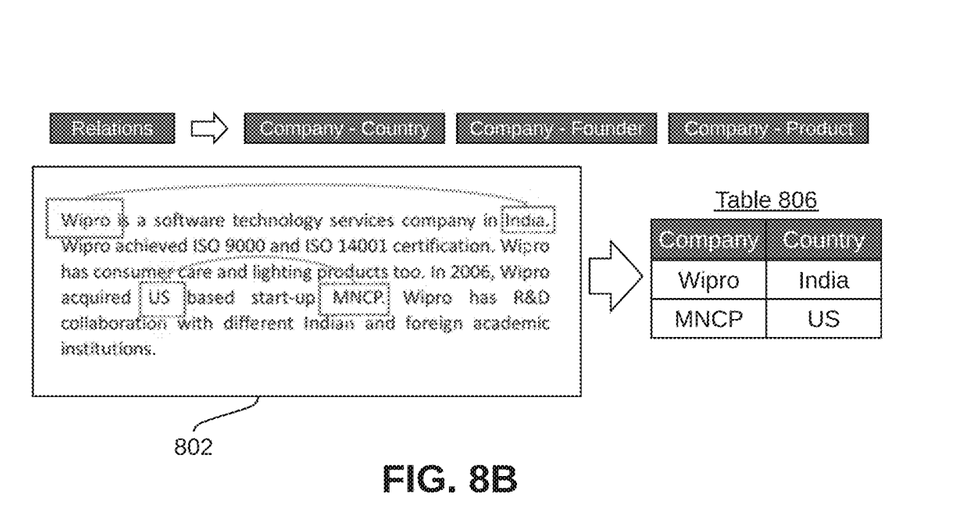

Referring now to FIGS. 8A and 8B, a process 800 of extracting relations from entities is illustrated, in accordance with an embodiment. As illustrated in FIG. 8A, an input text 802 including multiple sentences may be received. Further, a user input in the form of selection of an entity "Wipro" is received from a user. This selected entity may have one or more relations with one or more entities in the input text 802, as shown in the Table 804. For example, the entity "Wipro" has a "company-country" relation with entity "India", a "company-product" relation with entity "consumer care", and a "company-acquire" relation with entity "MNCP".

Further, as illustrated in FIG. 8B, a user input in form of selection of a relation "company-country" with respect to the input text 802 may be received. The pairs of entities holding the user-selected relation "company-country" are shown in the Table 806. The connected entities may be rendered graphically as overlay on top of the input text, for the purpose of visualization, as explained later.

Returning back to FIG. 6, at step 606, the extracted entities and relations between the entities may be rendered in a form of a knowledge graph to a user. In some embodiment, the knowledge graph may be overlaid over a plain text. By way of an example, the rendering module 204 may receive the extracted entities and the relations between the entities from the extracting module 202. In the knowledge graph, the extracted entities and the relations between the entities may be represented as connected through the selected relation. In some embodiments, a user input may be received for selection of a relation from a list. Accordingly, a graph may be generated and rendered to the user, showing all the entities which are connected through selected relation. In some embodiments, a user input may be received for selection of one or more entities from the unstructured text. Accordingly, the possible relations of the selected entity with all other entities present in the text may be generated.

At step 608, the relation-entity model may be dynamically updated based on the extracted entities and the relations between the entities, and a user feedback. For example, if the determined relation-entity pair is correct, the user may provide a feedback that the determined relation-entity pair is correct. However, if the determined relation is incorrect, then the user may provide the feedback that the determined relation is incorrect. The user may further provide a correct relation as the feedback with respect to the determined relation. Upon receiving the feedback from the user, the feedback may be used for updating the relation-entity model.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 9:
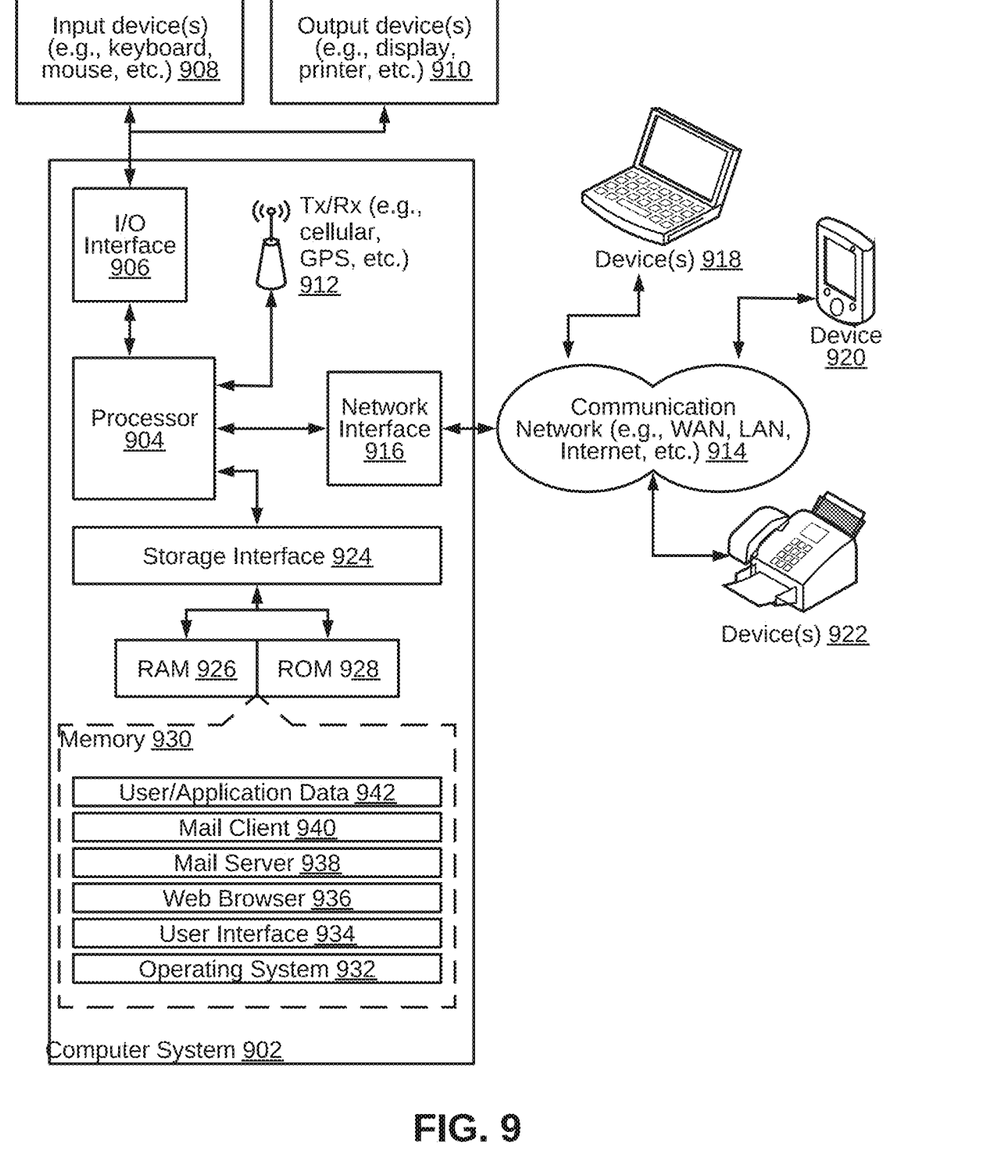
FIG. 9 is a block diagram of an exemplary computer system for implementing various embodiments.

The disclosed methods and systems may be implemented on a conventional or a general-purpose computer system, such as a personal computer (PC) or server computer. Referring now to FIG. 9, a block diagram of an exemplary computer system 902 for implementing various embodiments is illustrated. Computer system 902 may include a central processing unit ("CPU" or "processor") 904. Processor 904 may include at least one data processor for executing program components for executing user or system-generated requests. A user may include a person, a person using a device such as such as those included in this disclosure, or such a device itself. Processor 904 may include specialized processing units such as integrated system (bus) controllers, memory management control units, floating point units, graphics processing units, digital signal processing units, etc. Processor 904 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 904 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 904 may be disposed in communication with one or more input/output (I/O) devices via an I/O interface 906. I/O interface 906 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 906, computer system 902 may communicate with one or more I/O devices. For example, an input device 908 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 910 may be a printer, fax machine, video display (for example, cathode ray tube (CRT), liquid crystal display (LCD), light-emitting diode (LED), plasma, or the like), audio speaker, etc. In some embodiments, a transceiver 912 may be disposed in connection with processor 904. Transceiver 912 may facilitate various types of wireless transmission or reception. For example, transceiver 912 may include an antenna operatively connected to a transceiver chip (for example, TEXAS® INSTRUMENTS WILINK WL1286® transceiver, BROADCOM® BCM45501UB8® transceiver, INFINEON TECHNOLOGIES® X-GOLD 618-

PMB9800® transceiver, or the like), providing IEEE 802.6a/b/g/n, Bluetooth, FM, global positioning system (GPS), 2G/3G HSDPA/HSUPA communications, etc.

In some embodiments, processor 904 may be disposed in communication with a communication network 914 via a network interface 916. Network interface 916 may communicate with communication network 914. Network interface 916 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 914 may include, without limitation, a direct interconnection, local area network (LAN), wide area network (WAN), wireless network (for example, using Wireless Application Protocol), the Internet, etc. Using network interface 916 and communication network 914, computer system 902 may communicate with devices 918, 920, and 922. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® e-reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 902 may itself embody one or more of these devices.

In some embodiments, processor 904 may be disposed in communication with one or more memory devices (for example, RAM 926, ROM 928, etc.) via a storage interface 924. Storage interface 924 may connect to memory 930 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 930 may store a collection of program or database components, including, without limitation, an operating system 932, user interface application 934, web browser 936, mail server 938, mail client 940, user/application data 942 (for example, any data variables or data records discussed in this disclosure), etc. Operating system 932 may facilitate resource management and operation of computer system 902. Examples of operating systems 932 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 934 may facilitate display, execution, interaction, manipulation, or operation of program components through textual or graphical facilities. For example, user interfaces may provide computer interaction interface elements on a display system operatively connected to computer system 902, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 902 may implement a web browser 936 stored program component. Web browser 936 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 902 may implement a mail server 938 stored program component. Mail server 938 may be an Internet mail server such as MICROSOFT® EXCHANGE® mail server, or the like. Mail server 938 may utilize facilities such as ASP, ActiveX, ANSI C++/C#, MICROSOFT.NET® programming language, CGI scripts, JAVA® programming language, JAVASCRIPT® programming language, PERL® programming language, PHP® programming language, PYTHON® programming language, WebObjects, etc. Mail server 938 may utilize communication protocols such as internet message access protocol (IMAP), messaging application programming interface (MAPI), Microsoft Exchange, post office protocol (POP), simple mail transfer protocol (SMTP), or the like. In some embodiments, computer system 902 may implement a mail client 940 stored program component. Mail client 940 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 902 may store user/application data 942, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

As will be appreciated by those skilled in the art, the techniques described in the various embodiments discussed above pertain to determining relations between two or more entities in a text document. For example, the techniques include generating a relation-entity model using training data (the entities and the relations between the entities may be annotated in the training data). The techniques further include extracting entities and relations between the entities using the generated relation-entity model in response to receiving a text input and a user selected input. The techniques further include rendering the extracted entities and the relations between the entities in form of a knowledge graph to a user. The knowledge graph may be overlaid over a plain text. The techniques further include dynamically updating the relation-entity model based on the extracted entities and the relations between the entities, and a user feedback.

The above techniques, therefore, can be used to learn various relations from unstructured text and identify entities and relations between the entities for a new text input. The techniques are capable of considering numeric entities as input during extracting the relations between the entities, and accurately extracting relations between the entities. The above techniques further provide for rendering the extracted relations and the corresponding entities pictorially through a connected knowledge graph via an interactive GUI, thereby making the extracted entities and relations between the entities easily understandable. The interactive GUI further allows a user to provide a user input and generate the relation-entity pairs. Moreover, the above techniques further allow generating a table of relation-entities, automatically or on user request. In other words, the above techniques provide for an end-to-end solution for generating structured text from a plain unstructured text through a suitable selection of relations between entities.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of determining a relation between two or more entities in a text document, the method comprising:
   receiving, by a relation determining device, training text data annotated with two or more entities;
   creating, by the relation determining device, one or more n-grams based on the training text data;
   generating, by the relation determining device, a Convolutional Neural Network (CNN) model using the one or more n-grams;
   creating, by the relation determining device, an entity vector using at least one of a word embedding and a numeric embedding based on the training text data; and
   generating, by the relation determining device, a relation-entity model using the CNN model and the entity vector, wherein generating the relation-entity model comprises:
      creating a first set of features using one or more consecutive words of the training text data, based on convolution filter of the CNN model;
      generating a second set of features based on one or more fully connected (FC) layers of the CNN model; and
      generating the relation-entity model using the CNN model, and the first set of features and the second set of features.

2. The method of claim 1, wherein the training text data comprises one or more textual sentences.

3. The method of claim 1, wherein generating the CNN model further comprises:
   receiving a base model trained on a corpus of data similar to the training text data;
   extracting one or more parameters from the base model; and
   generating a CNN model using the one or more parameters wherein at least one of a plurality of layers of the CNN model are trainable using training text data.

4. The method of claim 3, wherein the one or more parameters comprise one or more learned weights associated with the CNN model.

5. The method of claim 1, further comprising:
   receiving an input text data; and
   determining one or more entities and one or more relation between two or more entities from the input text data, using the relation-entity model.

6. The method of claim 5, further comprising:
   receiving from a user a selection of an entity from the input text;
   determining one or more relations of the selected entity with one or more entities in the input text;
   generating a graphical representation of the relation of the selected entity with the one or more entities in the input text; and
   rendering the graphical representation via a graphical user interface (GUI).

7. The method of claim 6, further comprising:
   receiving from a user a feedback on the extracted one or more entities and the one or more relation between the two or more entities; and
   updating the relation-entity model based on the feedback.

8. A system for determining a relation between two or more entities in a text document, the system comprising:
   a relation determining device comprising a processor and a memory communicatively coupled to the processor, wherein the memory stores processor instructions, which, on execution, causes the processor to:
   receive training text data annotated with two or more entities;
   create one or more n-grams based on the training text data;
   generate a Convolutional Neural Network (CNN) model using the one or more n-grams;

create an entity vector using at least one of a word embedding and a numeric embedding based on the training text data; and
generate a relation-entity model using the CNN model and the entity vector, wherein generating the relation-entity model comprises:
    creating a first set of features using one or more consecutive words of the training text data, based on convolution filter of the CNN model;
    generating a second set of features based on one or more fully connected (FC) layers of the CNN model; and
    generating the relation-entity model using the CNN model, and the first set of features and the second set of features.

9. The system of claim 8, wherein the training text data comprises one or more textual sentences.

10. The system of claim 8, wherein generating the CNN model further comprises:
    receiving a base model trained on a corpus of data similar to the training text data;
    extracting one or more parameters from the base model; and
    generating a CNN model using the one or more parameters wherein at least one of a plurality of layers of the CNN model are trainable using training text data.

11. The system of claim 10, wherein the one or more parameters comprise one or more learned weights associated with the CNN model.

12. The system of claim 8, wherein the processor instructions further cause the processor to:
    receive an input text data; and
    determine one or more entities and one or more relation between two or more entities from the input text data, using the relation-entity model.

13. The system of claim 12, wherein the processor instructions further cause the processor to:
    receive from a user a selection of an entity from the input text;
    determine one or more relations of the selected entity with one or more entities in the input text;
    generate a graphical representation of the relation of the selected entity with the one or more entities in the input text; and
    render the graphical representation via a graphical user interface (GUI).

14. The system of claim 13, wherein the processor instructions further cause the processor to:
    receive from a user a feedback on the extracted one or more entities and the one or more relation between the two or more entities; and
    update the relation-entity model based on the feedback.

15. A non-transitory computer-readable storage medium having stored thereon, a set of computer-executable instructions causing a computer comprising one or more processors to perform steps comprising:
    receiving training text data annotated with two or more entities;
    creating one or more n-grams based on the training text data;
    generating a Convolutional Neural Network (CNN) model using the one or more n-grams;
    creating an entity vector using at least one of a word embedding and a numeric embedding based on the training text data; and
    generating a relation-entity model using the CNN model and the entity vector, wherein generating the relation-entity model comprises:
        creating a first set of features using one or more consecutive words of the training text data, based on convolution filter of the CNN model;
        generating a second set of features based on one or more fully connected (FC) layers of the CNN model; and
        generating the relation-entity model using the CNN model, and the first set of features and the second set of features.

* * * * *